Oct. 5, 1926.
E. WILDHABER
HELICAL GEARING
Filed Nov. 2, 1923 2 Sheets-Sheet 1
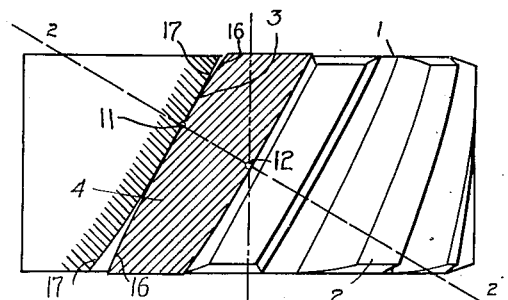
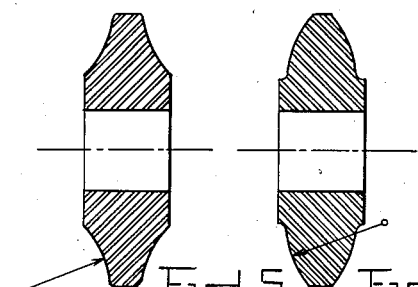
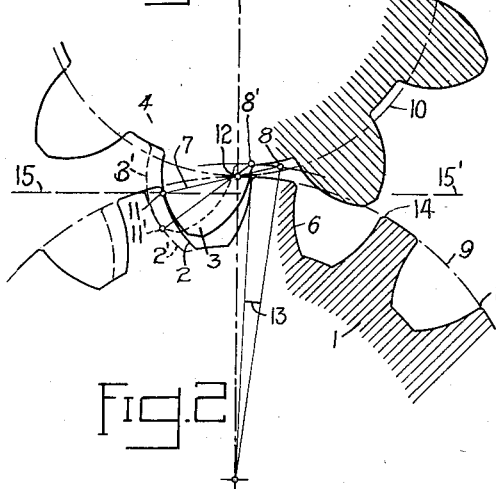
Ernest Wildhaber
INVENTOR
BY
his ATTORNEY

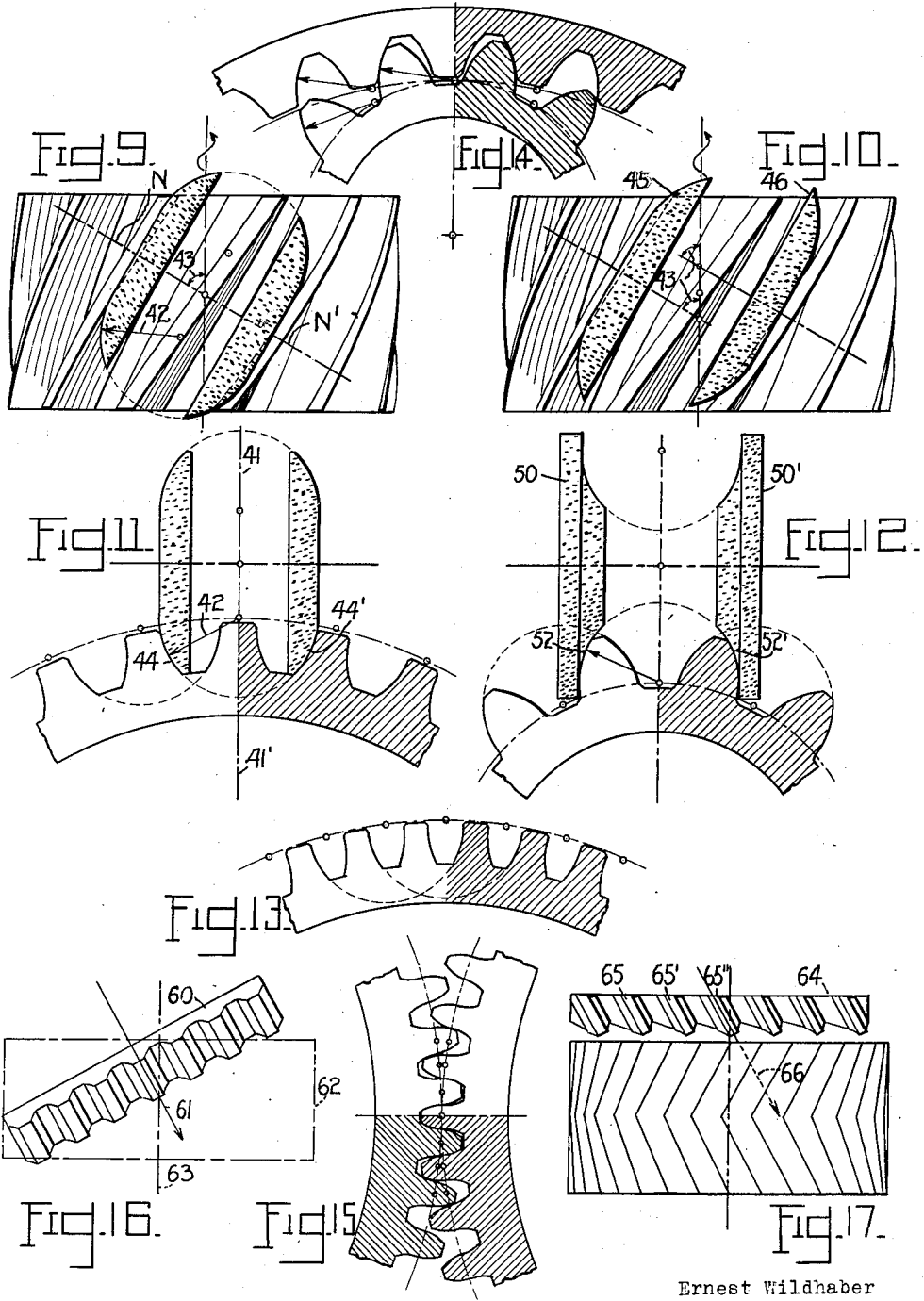

Patented Oct. 5, 1926.

1,601,750

UNITED STATES PATENT OFFICE.

ERNEST WILDHABER, OF BROOKLYN, NEW YORK.

HELICAL GEARING.

Application filed November 2, 1923. Serial No. 672,254.

My invention relates to the tooth shape of gears, which run on parallel axes, and may be applied to helical gears, such as single helical gears and double helical gears or herringbone gears.

One purpose of my invention is to provide helical gearing with improved tooth contact, so as to lessen surface stresses and wear.

A further purpose of the invention is to provide helical gearing, which is capable of rapid and accurate production, and which may be ground without difficulty, if so desired.

A still further purpose of the invention is to provide accurate gearing of circular tooth profile.

My invention is illustratively exemplified in the accompanying drawings, in which, Figure 1 is a side elevational view of my improved gear showing parts thereof in section; Figure 2 is a normal sectional view of Figure 1, taken on the lines 2—2 of the latter figure; Figure 3 is a side elevational view of a pair of gears constructed in accordance with my invention; Figure 4 is a sectional view taken through a pair of gears; Figures 5 and 6 are sectional views of milling cutters used in the manufacture of my improved gears; Figures 7 and 8 are elevational views of corresponding tools of rack shape, to be used in reciprocating machines for cutting helical gears in accordance with my invention; Figures 9 and 10 are side elevational views of my improved gear showing a pair of grinding wheels in different operating positions, the wheels being set to grind opposite tooth surfaces; Figure 11 is a view of a gear taken in normal section and showing the grinding wheels in operating position; Figure 12 is a view of a mate pinion showing the grinding wheels in operating position; Figure 13 is a view of modified form of gear made in accordance with my invention; Figure 14 is a sectional view taken through an internal gear and its pinion; Figure 15 is a normal section through helical teeth of composite outline, constructed from my invention; Figure 16 is a view of a reciprocating tool of rack shape in operating position; and Figure 17 is a view of a modified type of reciprocating tools, in position to start a cut on a herringbone gear.

Referring to the drawings, and particularly to Figures 1 and 2, 1 denotes a helical gear having teeth 2 in contact with the teeth 3 of a mating pinion 4. In order to clearly illustrate the degree of contact between the teeth of the gear and pinion the tooth 4 is shown in section in Figure 1.

It is customary to analyze helical gearing with reference to a normal section, i. e. line 2—2 of Figure 1, line 2—2 being normal to the helix of the pitch circle. Figure 2 illustrates the said normal section 2—2 for both pinion 4 and gear 1.

It has been assumed as an example, that the tooth profiles 6 of gear 1 are circular arcs of radii 7 and centers 8, in the shown normal section. Centers 8 are situated close to the pitch circle 9 of the gear. The corresponding teeth of pinion 4 are so shaped as to allow rolling of the pitch circles 9 and 10 on each other, as well known to those skilled in the art.

When the gear tooth 2 is in the position shown, in Figures 1 and 2, and its center at 8, then it contacts with tooth 3 at point 11, which may be determined by a perpendicular to tooth 2 through point 12, point 12 being the contact point between the two pitch circles 9 and 10. The said perpendicular is in the present case the connecting line between point 12 and center 8 of the tooth profile.

Another position 2' of the gear tooth, and 3' of the coresponding pinion tooth are shown in dotted lines in Figure 2. The tooth profiles contact here at a point 11', which can be determined like point 11. It will be noted that the contact point has traveled from 11 to 11' during a small angular motion of the gears. The contact point has passed practically over the whole active profile during a turning angle 13 of the gear, which angle corresponds to a fraction only of the normal pitch 14, 14'. The said normal pitch equals the circular pitch of the shown normal section.

In gearing now in use, however, the tooth outline and the tooth proportions are so selected, that the contact of corresponding normal profiles lasts for an angle, which, as a rule, corresponds to more than one full pitch.

In gearing according to my invention, the contact point between two normal profiles passes over the whole active profile during a turning angle, which corresponds to less than one half the normal pitch, and usually to much less than that.

I have found, that gearing designed according to my invention, allows the teeth to come into better contact with each other, inasmuch as the tooth surfaces remain much closer to each in a direction perpendicular to the contact line between two mating teeth. This is illustrated by a section taken in direction of lines 15, 15' of Figure 2. In Figure 1 the lateral profile 16 of tooth 3 and profile 17 of tooth 2 of said section are shown to contact at point 11, and to remain close to each other on their whole length. The same holds true for other sections, taken parallel to section 15, 15'.

Close contact between teeth is well known to reduce wear and to improve the efficiency of the gears.

Although a circular arc is shown as the normal tooth profile of gear 1, in Figure 2, it will be understood, that this is not the only shape to effect the stated purpose, of increasing the speed, at which the contact point travels over the tooth profile of a normal section. As a rule, however, the shape can be approximated by a circle, whose center is close to the pitch center.

The gearing according to the present invention is strictly a gearing for helical teeth. It would not be advisable on straight teeth, on account of the explained short duration of contact between tooth profiles. This would cause intermittant action, whereas on helical gears similar parts of the teeth are always in contact, on account of the twisted nature of the tooth surfaces.

Figure 3 may be considered as a view taken in the direction of the axes of a pair of gears. The tooth profiles are then circles in a section, which is perpendicular to the axes. The gear is provided with helical teeth, with working faces below the pitch circle 20, while the pinion teeth have working faces above the pitch circle 21 only. The working profiles 22 of the gear are concave and circular, and their centers are substantially situated on the pitch circle 20. The convex working profiles 23 of the pinion are also of circular shape. Their radii 24 are substantially the same as the radii 25 of the mate profiles. The centers 26, 26', 26" are similarly situated on pitch circle 21. Profile centers 27, 27', 27" of pitch circle 20, and profile centers 26, 26', 26" of pitch circle 21 correspond to each other. They coincide during the mesh, which takes place on the whole tooth profile at once.

Figure 3 can also be considered as a section perpendicular to the helical teeth, and shows then the normal tooth profiles.

Figure 4 shows a refinement of the preferred embodiments of my invention. It is a normal section through the helical teeth, but can also be considered as a section perpendicular to the axes. Corresponding profiles 30 and 31 are circular, as in Figure 3, but in this case the radius of the concave circular profile 30 is made a trifle larger than the radius of the convex circular profile 31. Consequently the profile centers 32 and 33 do not exactly coincide during the mesh. The radii 34 and 35 of the circles 36 and 37, constituted by the profile centers 32 and 33 respectively, are not accurately identical with the pitch radii 38 and 39 of the two gears. The sum of the radii 34 and 35 is a trifle larger than the sum of the pitch radii. The radii 34 and 35 are so selected, that the main tooth pressure runs about in a direction 33, 40.

The slight difference of the radii of profiles 30 and 31 facilitates the tooth contact, and allows for small errors in making and assembling.

Figures 5 and 6 show a pair of milling cutters for milling conjugate teeth. The cutters may be applied in the usual manner, their axes being inclined in correspondence with the tooth inclination, i. e. with the helix angle of teeth. It will be found that the cutters are to be inclined for an angle, which is a trifle smaller than the helix angle in the pitch circle, for producing most accurate results.

In Figures 7 and 8 I have shown a pair of rack shaped cutters, for use in a reciprocating machine. The teeth of these tools are relieved inwardly, in the usual manner, as evident by the dotted lines.

The convex grinding wheels shown in Figure 9 are illustrated in their operating positions, in a view which is taken perpendicular to the axis of the gear blank as well as to the axis of the grinding wheels, i. e. in a view along the gear radii 41, 41' of Figure 11. The wheels, which are to produce concave circular teeth profiles in a normal section, are of convex circular profile, its radius 42 being the same as the radius of the concave circular profile. The grinding wheels are inclined for an angle 43, which equals the helix angle of the teeth, in the pitch circle. The wheels grind along their profiles indicated in dotted lines 44 and 44', which are located in a normal section. As shown in Figure 9, the two grinding wheels are coaxially arranged with respect to each other.

The device shown in Figure 10 corresponds to that shown in Figure 9, with the exception that the grinding wheels 45 and 46 are not coaxially arranged. Although the arrangement shown in Figure 9 imposes certain restrictions on the tooth design, it is frequently preferred. The arrangement of Figure 10 is advantageous, when grinding wheels are not free to run out, for instance when they must clear against a shoulder, or in the case of herringbone teeth.

Referring particularly to Figure 11, a normal section is illustrated and taken along lines N, N' of Figure 9. In this view the axis of the coaxially arranged grinding wheels is situated in the said normal section. The wheels grind along the profiles 44 and 44' of the shown normal section, while the blank performs a translatory motion in the direction of its axis, and, in timed relation thereto, a turning motion about its axis. In other words, the blank is screwed past the grinding wheels.

Figure 12 discloses a normal section through the teeth of the mating gear or pinion. Grinding wheels 50 and 50' are provided with concave circular profiles 52 and 52' with which they grind the convex gear teeth.

It will be understood, that milling cutters might be used instead of the grinding wheels shown in Figures 9 to 12; and also that grinding wheels of a shape shown in Figures 5 and 6 might be used, if so desired.

The teeth ground according to Figures 9, 11 and 12 are preferably so designed, that the centers of opposite tooth arcs 44 and 44', 52 and 52', respectively, in Figure 12 coincide. In Figures 11 and 12 the tooth arcs of every third tooth side have a common center.

The tooth arcs of every fifth tooth side have a common center in the normal section shown in Figure 13.

In Figure 11 the common center of opposite tooth arcs of alternate teeth is situated on the center line of the intermediate tooth. The corresponding pinion shows convex circular profiles, of which opposite tooth sides of adjacent teeth have common centers in the middle of the intermediate tooth space.

The normal section shown in Figure 14 shows an internal gear and its mate pinion, constructed in accordance with my invention. It will be noted that the internal gear is preferably provided with the concave tooth profiles. In external gears similarly preference is given to providing the larger gear with concave tooth profiles.

The normal section through a pair of helical gears shown in Figure 15, discloses opposite tooth profiles, the addendum being convex and the dedendum concave.

A rack shaped planing tool is illustrated in operating position in Figure 16. Tools of this kind have been shown in another view in the Figures 7 and 8. The reciprocatory tool 60 moves in the direction 61, at an inclination, which equals the helix angle of the teeth. Gear 62, with its axis 63, is shown in dotted and dash lines. In order to cut the proper tooth shape, gear blank 62 after every cut is slightly fed in a rolling generating motion with respect to a rack which is embodied by tool 60.

Another reciprocatory tool 64 is shown in Figure 17, the tool in this case being provided with stepped teeth 65, 65', 65" which allow it to clear shoulders, and herringbone teeth. The tool moves in direction 66 of the helical teeth, which it cuts.

Other ways of producing gearing according to my invention, i. e. hobbing, planing with a pinion cutter, rolling and casting, may be contemplated, but it is not deemed necessary at this time to give a detailed explanation of the mechanism used in connection therewith.

Briefly stated my invention consists in providing helical gearing of such profile, that the tooth contact passes rapidly over the normal profile of the teeth. This has been found to result in close contact between helical mate teeth. In a direction at right angles to the contact line, the mate teeth recede from each other only slightly, and thus provide a tooth contact, which is not very far from surface contact.

What I claim and desire to secure by Letters Patent is:—

1. Helical gear teeth with an active profile of approximately the form of a single circular arc, in a section laid perpendicularly to the tooth direction, the said profile being so positioned with respect to the pitch circle of that gear that the tooth contact with a mate gear passes over the said profile during a turning angle, which corresponds to less than one half of the normal pitch.

2. Helical gear teeth containing an active profile of the form of a single-circular arc, in a section which is laid through the radius of the gear, the center of said profile being located substantially on the pitch circle of the gear.

3. Helical gear teeth with an active profile of the form of a single circular arc shape in a section, which is laid perpendicularly to the tooth direction, the center of said profile being located practically in the pitch circle of the gear.

4. Helical gear teeth containing only a concave working face, substantially situated below the pitch circle, the profile of said working face in a normal section being circular, and the center of said profile being located on the pitch circle.

5. Helical gear teeth of concave, substantially circular working profile, the center of said profile being located practically on the pitch circle, and outside of the center of the tooth space to which it belongs.

6. Helical gear teeth with active profiles of circular shape in a normal section, the centers of said profiles being located practically on the pitch circle and so disposed that centers of two opposite sides of different teeth coincide.

7. Helical gear teeth containing only a convex working face situated above the pitch circle, the profile of said working face being circular in a normal section, and the center of said profile being located practically on the pitch circle.

8. Helical gear teeth of convex, substantially circular working profile, in normal section, the center of said profile being located practically on the pitch circle, and outside of the center line of the tooth, to which it belongs.

9. Helical gear teeth provided with working faces of convex circular profile, the center of said profile being located on the pitch circle, and its radius being larger than one quarter of the normal pitch.

10. Helical gear teeth provided exclusively with working faces of concave circular profile, the center of said profile being located on the pitch circle, and its radius amounting to one half up to one and one half times the normal pitch of the teeth.

11. Helical teeth of a pair of mate gears, the teeth of one gear being provided exclusively with convex working faces of substantially circular profile, the teeth of the other gear having exclusively concave working faces of substantially the same profile.

12. Helical teeth of a pair of gears, the teeth of the pinion being provided exclusively with convex working faces of substantially circular profile in normal section, the center of said profile being located close to the pitch circle, the teeth of the gear having concave working faces of substantially the same profile.

13. A pair of gears, having teeth extending across the faces of said gears along lines inclined to the generatrices of the respective pitch surfaces the tooth profiles of one gear being exclusively convex circular arcs, and the mate tooth profiles of the other gear of said pair being exclusively concave circular arcs of substantially the same radius.

14. A pair of gears, having teeth extending across the faces of said gears along lines inclined to the straight generatrices of the respective pitch surfaces, the pinion having a convex and substantially circular tooth profile in a section which is perpendicular to its pitch surface, the center of said tooth profile being approximately situated in the pitch surface, the mate gear having a concave mate tooth profile which is substantially a circular arc of the same radius.

15. A pair of gears, having teeth extending across the faces of said gears along lines inclined to the generatrices of the respective pitch surfaces, the pinion having a convex and substantially circular tooth profile in a section laid perpendicularly to the direction of a tooth, the center of said profile being situated on the pitch surface of said pinion, the mate gear having a concave mate tooth profile, which is substantially a circular arc of the same radius, said arc having its center on the pitch surface of the gear.

16. A pair of gears, having teeth extending across the faces of said gears along lines inclined to the straight generatrices of the respective pitch surfaces, one of said gears having convex tooth profiles and the other of said gears having concave tooth profiles, said profiles being substantially circular arcs and being substantially the same all along a tooth side.

17. A pair of gears having teeth extending across their faces along lines inclined to the generatrices of their respective pitch surfaces, one of said gears having a tooth profile which is convex in a section laid perpendicular to the direction of a tooth and the other of said gears having a tooth profile which is concave in a section laid perpendicular to the direction of a tooth, the mate profiles being substantially equal circular arcs and each profile being the same all along a tooth side.

18. A pair of gears, having teeth extending across the faces of said gears along lines inclined to the generatrices of the respective pitch surfaces, said gears having complementary tooth profiles in a section laid perpendicularly to the direction of a tooth, mate profiles being convex and concave circular arcs, the radii of said arcs being larger than one half of the normal pitch.

19. A gear having teeth extending across its face along lines inclined to the generatrices of its pitch surface, said gear having side tooth surfaces whose working portions are in the form of single circular arcs whose centers are located substantially on the pitch surface of the gear.

20. A gear having teeth extending across its face along lines inclined to the generatrices of its pitch surface, said gear having side tooth surfaces whose working portions are in the form of single circular arcs whose centers lie outside the teeth and are located substantially on the pitch surface of the gear.

21. A pair of gears provided with teeth which extend across their faces along lines inclined to the generatrices of their respective pitch surfaces, one of said gears being provided with active tooth surfaces which are exclusively convex circular arcs and the other of said gears having active tooth surfaces which are exclusively concave circular arcs.

22. A gear having teeth extending across it face along lines inclined to the generatrices of its pitch surface, said gear having teeth whose active tooth surfaces have profiles in the form of single circular arcs the centers of the profiles of a tooth lying on opposite sides of said tooth and being located substantially on the pitch surface of said gear.

23. A gear having teeth extending across its face along lines inclined to the generatrices of its pitch surface, said gear having teeth whose active tooth surfaces have profiles in the form of single circular arcs, the centers of the profiles of a tooth lying on opposite sides of said tooth and outside of said tooth and being located substantially on the pitch surface of said gear.

24. A pair of gears provided with teeth which extend across their faces along lines inclined to the generatrices of their respective pitch surfaces, said gears having teeth with active tooth surfaces the profiles of which are single circular arcs, mate profiles having substantially the same radius.

25. A pair of gears provided with teeth which extend across their faces along lines inclined to the generatrices of their respective pitch surfaces, the teeth of said gears having active tooth surfaces the profiles of which are single circular arcs the centers of which are located outside of the respective teeth, mate tooth profiles having substantially the same radius.

26. A pair of gears provided with teeth which extend across their faces along lines inclined to the generatrices of their respective pitch surfaces, one of said gears having active tooth surfaces whose profiles are exclusively convex circular arcs and the other of said gears having active tooth surfaces whose profiles are exclusively concave circular arcs, the centers of the tooth surfaces of each gear being located outside of the respective teeth of such gear.

27. A pair of gears provided with teeth which extend across their faces along lines inclined to the generatrices of their respective pitch surfaces, each of said gears being provided with active tooth surfaces whose profiles are single circular arcs, the active tooth surfaces of one gear being situated outside the pitch surface of said gear and the active tooth surfaces of the other gear being situated inside the pitch surface of said gear.

28. A pair of gears provided with teeth which extend across their faces along lines inclined to the generatrices of their respective pitch surfaces, said gears having complementary tooth profiles, mate profiles being respectively convex and concave circular arcs of substantially equal radii whose centers lie on the pitch surfaces of the respective gears.

In testimony whereof I affix my signature.

ERNEST WILDHABER.